United States Patent
Himayat et al.

(10) Patent No.: US 12,187,301 B2
(45) Date of Patent: Jan. 7, 2025

(54) DISTRIBUTED LEARNING TO LEARN CONTEXT-SPECIFIC DRIVING PATTERNS

(71) Applicant: Intel Corporation, Santa Clara, CA (US)

(72) Inventors: Nageen Himayat, Fremont, CA (US); Maruti Gupta Hyde, Portland, OR (US); Ravikumar Balakrishnan, Beaverton, OR (US); Mustafa Akdeniz, San Jose, CA (US); Marcin Spoczynski, Leixlip (IE)

(73) Assignee: Intel Corporation, Santa Clara, CA (US)

( * ) Notice: Subject to any disclaimer, the term of this patent is extended or adjusted under 35 U.S.C. 154(b) by 817 days.

(21) Appl. No.: 17/133,125

(22) Filed: Dec. 23, 2020

(65) Prior Publication Data

US 2021/0188306 A1 Jun. 24, 2021

(51) Int. Cl.
| | |
|---|---|
| *G06N 20/00* | (2019.01) |
| *B60W 50/06* | (2006.01) |
| *B60W 60/00* | (2020.01) |
| *G06N 5/04* | (2023.01) |
| *G06V 10/764* | (2022.01) |

(Continued)

(52) U.S. Cl.
CPC ............ *B60W 50/06* (2013.01); *B60W 60/00* (2020.02); *G06N 5/04* (2013.01); *G06N 20/00* (2019.01); *G06V 10/764* (2022.01); *B60W 2420/403* (2013.01); *B60W 2420/408* (2024.01); *B60W 2420/54* (2013.01); *B60W 2556/65* (2020.02); *G06F 18/214* (2023.01); *G06V 20/56* (2022.01)

(58) Field of Classification Search
CPC .. B60W 50/06; B60W 60/00; B60W 2556/65; B60W 2420/408; B60W 2420/403; B60W 2420/54; G06N 20/00; G06N 5/04; G06V 10/764; G06V 20/56; G06F 18/214
USPC .......................................................... 701/27
See application file for complete search history.

(56) References Cited

U.S. PATENT DOCUMENTS

| | | | | |
|---|---|---|---|---|
| 10,820,166 | B1 * | 10/2020 | Zhang | ................... H04W 4/185 |
| 2017/0272972 | A1 | 9/2017 | Egner et al. | |
| 2019/0311298 | A1 | 10/2019 | Kopp et al. | |

(Continued)

OTHER PUBLICATIONS

"European Application Serial No. 21209135.9, Communication Pursuant to Article 94(3) EPC mailed Apr. 25, 2023", 8 pgs.

(Continued)

*Primary Examiner* — Tiffany P Young
(74) *Attorney, Agent, or Firm* — Schwegman Lundberg & Woessner, P.A.

(57) ABSTRACT

A method of implementing distributed AI or ML learning for autonomous vehicles is disclosed. An AI or ML model specific to a location or a type of the location is generated at a vehicle. In response to a detection that the vehicle is within a proximity to a road side unit (RSU) associated with the location or the type of the location or the vehicle is within a proximity to an additional vehicle that is present or anticipated to be present at the location or the type of the location, causing an AI or ML model transmission to the additional vehicle or the RSU. Based on the causing the AI or ML model reception, causing deployment of an additional AI or ML model in the vehicle to optimize the vehicle for the location or the type of the location.

18 Claims, 7 Drawing Sheets

(51) Int. Cl.
   *G06F 18/214*      (2023.01)
   *G06V 20/56*       (2022.01)

(56) References Cited

U.S. PATENT DOCUMENTS

2020/0017117 A1\*  1/2020  Milton ................. G08G 1/0112
2020/0132011 A1    4/2020  Kitagawa et al.

OTHER PUBLICATIONS

"European Application Serial No. 21209135.9, Response filed Aug. 25, 2023 to Communication Pursuant to Article 94(3) EPC mailed Apr. 25, 2023", 7 pgs.

"European Application Serial No. 21209135.9, Response filed Dec. 19, 2022 to Extended European Search Report mailed Apr. 20, 2022", 8 pgs.

"European Application Serial No. 21209135.9, Extended European Search Report mailed Apr. 20, 2022", 10 pgs.

Yu, Zhengxin, "Mobility-Aware Proactive Edge Caching for Connected Vehicles Using Federated Learning", IEEE Transactions On Intelligent Transportation Systems, IEEE, Piscataway, NJ, USA, vol. 22, No. 8, (Aug. 331, 2020), 5341-5351.

Abbas, H, et al., "A driving license test for driverless vehicles", presentation by Univ. of Pennsylvania, (Dec. 2017), 5 pgs.

Augenstein, Sean, et al., "Generative models for effective ML on private, decentralized datasets", arXiv:1911.06679 ICLR 2020, (2019), 26 pgs.

Bojarski, Mariusz, et al., "End-to-End deep learning for self-driving cars", https://developer.nvidia.com/blog/deep-learning-self-driving-cars/, (Aug. 17, 2016), 13 pgs.

Okelly, M, et al., "Scalable End-to-End Autonomous Vehicle Testing via Rare-event Simulation", arXiv.org > cs > arXiv:1811.00145, (Jan. 12, 2019), 18 pgs.

Sinha, Aman, et al., "Formula-Zero: Distributionally Robust Online Adaptation via Offline Population Synthesis", arXiv:2003.03900v2 ICML 2020 submission, (Aug. 22, 2020), 40 pgs.

Wang, Tsun-Hsuan, et al., "V2VNet: Vehicle-to-Vehicle Communication for Joint Perception and Prediction", arXiv:2008.07519v1, (Aug. 17, 2020), 17 pgs.

"European Application Serial No. 21209135.9, Communication Pursuant to Article 94(3) EPC mailed Jan. 2, 2024", 7 pgs.

"European Application Serial No. 21209135.9, Response filed Apr. 8, 2024 to Communication Pursuant to Article 94(3) EPC mailed Jan. 2, 2024", 47 pgs.

"European Application Serial No. 21209135.9, Communication Pursuant to Article 94(3) EPC mailed Jul. 17, 2024", 7 pgs.

\* cited by examiner

DISTRIBUTED LEARNING TO LEARN CONTEXT-SPECIFIC DRIVING PATTERNS

TECHNICAL FIELD

Embodiments described herein generally relate to training of artificial intelligence (AI) or machine-learning (ML) models for automated systems, and, in one particular example, to a method and system of distributed learning to learn context-specific driver patterns.

BACKGROUND

AI or ML models for Autonomous Driving (AD) may be trained to perform complex functions, including, for example, directly issuing steering commands to a vehicle based on camera and other sensory inputs within the vehicle. Typically, these models are trained offline and require large amounts of sensory data to be sent for centralized training. However, such data may be privacy sensitive; hence, sharing raw sensory data may not be feasible in some instances (e.g., when certain governmental regulations apply). Furthermore, such training data typically does not account for many different contexts in which a vehicle may be operating. Additionally, transporting contextual data may incur bandwidth costs and/or present privacy issues.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
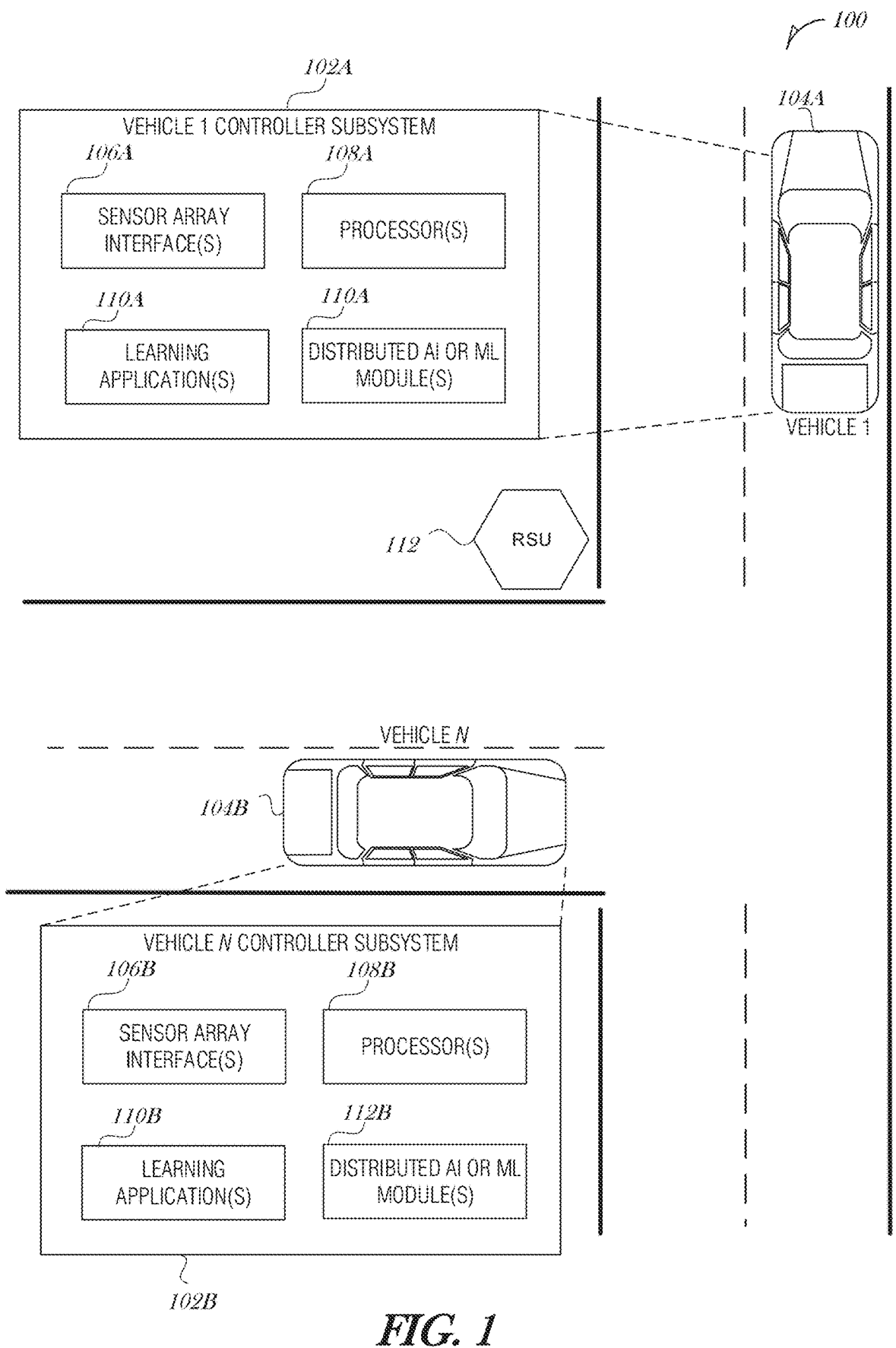
FIG. 1 is a schematic drawing illustrating a system in which various disclosed embodiments may be deployed.

In the following description, for purposes of explanation, numerous specific details are set forth in order to provide a thorough understanding of some example embodiments. It will be evident, however, to one skilled in the art that the present disclosure may be practiced without these specific details.

Disclosed herein are systems and methods for generating AI or ML models for AD that factor-in context- and location-specific types of behavior (e.g., behavior changes at intersections, merges, etc.), account for behavior of other drivers or cars in the vicinity, and are based on other supplemental training data (e.g., actual steering commands issued in vehicles operating in specific locations or contexts), resulting in better safety and efficiency when the models are generated and deployed within a vehicle.

An important tenet of driving is the ability to anticipate driving behavior of surrounding vehicles. Unsafe driving behaviors can be reduced or eliminated by aggregation of collected training data (e.g., sensor data, driving commands data, and/or video data) with AI techniques that factor-in context-specific behaviors of cars in a close-by cluster. In example embodiments, various technological problems with training ML or AI models for AD are solved, such as optimizing processing power, memory, or bandwidth for training of ML or AI models, complying with one or more data privacy policies or constraints with respect to training data, or optimizing ML or AI models for specific contexts or locations in which a vehicle is determined to be operating. In example embodiments, the solution includes training AI or ML models in a distributed manner using data collected for a particular context and/or a particular location from a cluster of vehicles that have operated and/or are currently operating in that particular context and/or that particular location.

In example embodiments, one or more AI or ML models for AD may be applied across many additional applications beyond car steering, such as parking the car in a close-by parking place or calling an ambulance in case of an accident. In example embodiments, fleet management systems are improved (e.g., based on generation of profiles of drivers or vehicles that allow for removal of unsafe vehicles or drivers from the road).

In example embodiments, a distributed learning framework is implemented wherein one or more vehicles driving close to a roadside unit (RSU) can contribute parameters of a locally-learned model to a server hosted within the RSU. In example embodiments, the RSU may be placed in a selected context, such as an intersection, wherein locally-learned models are determined to have more accuracy than more abstract models with respect to one or more key performance indicators discussed herein, such as driver safety or pedestrian safety. Per vehicle or per user profiles (e.g., of driving behaviors) can then be used to train AD models in a correlated manner, accounting for behaviors of multiple agents at a given instance/location. Once the correlated, time and location specific multi-agent driving behavioral models are collected, many different methods may be used to develop optimal AD algorithms targeting different objectives or key performance indicators, such as (a) driving efficiency subject to safety rules such as RSS, (b) defensive driving that emphasizes safety with relaxed requirements on driving time, and so on.

In example embodiments, distributed training, wherein AD models or AI- or ML-based user profile models are trained locally within a vehicle and then combined in a coordinated manner (e.g., at a server associated with a given location/temporal context) is implemented for use in automation of training of multi-agent, context specific AD solutions. Advantages include one or more of the following: privacy-preserving and bandwidth-efficient approach to profiling user behavior, collecting training data for AI models for profiling driving patterns as a function of location and time across multiple agents, or enhanced AD solutions for capturing location/time specific driving profiles of users or vehicles.

A method of implementing distributed AI or ML learning for autonomous vehicles is disclosed. A plurality of vehicles is identified based on a context of an operation of each of the plurality of vehicles. The context of the operation includes at least one of a location and a type of the location. Each of the plurality of vehicles has generated an AI or ML model specific to the location or the type of the location based on training data collected from one or more sensors of the vehicle while the vehicle was present at the location or the type of the location. Based on a detection that one of the plurality of vehicles is within a proximity to a road side unit (RSU) associated with the location or the type of the location or based on a detection that the one of the plurality of vehicles is within a proximity to an additional vehicle that is present or anticipated to be present at the location or the type of the location, the AI or ML model is caused to be transmitted from the RSU or the one of the plurality of vehicles to the additional vehicle. The transmitted AI or ML model is caused to be deployed in the additional vehicle such that at least one assessment of an AI or ML autonomous driving application configured to control the additional vehicle is optimized for the location or the type of the location. Additional embodiments are described below.

FIG. 1 is a schematic drawing illustrating a system 100 in which various disclosed embodiments may be implemented.

A plurality of autonomous vehicles, including vehicle 1 104A through vehicle n 104B, may each be of one or more types of vehicles, such as a commercial vehicle, a consumer vehicle, a recreation vehicle, a car, a truck, a motorcycle, a drone, or a boat, able to operate at least partially in an autonomous mode. Each of the plurality of autonomous vehicles may operate at sometimes in a manual mode where the driver operates the vehicle conventionally using pedals, steering wheel, and other controls. At other times, the vehicle may operate in a fully autonomous mode, where the vehicle operates without user intervention. In addition, the vehicle may operate in a semi-autonomous mode, where the vehicle controls many of the aspects of driving, but the driver may intervene or influence the operation using conventional (e.g., steering wheel) and non-conventional inputs (e.g., voice control).

In example embodiments, each of the plurality of vehicles includes a sensor array, which may include various forward, side, and rearward facing cameras, radar, LIDAR, ultrasonic, or similar sensors. Forward-facing is used in this document to refer to the primary direction of travel, the direction the seats are arranged to face, the direction of travel when the transmission is set to drive, or the like. Conventionally then, rear-facing or rearward-facing is used to describe sensors that are directed in a roughly opposite direction than those that are forward or front-facing. It is understood that some front-facing camera may have a relatively wide field of view, even up to 180-degrees. Similarly, a rear-facing camera that is directed at an angle (perhaps 60-degrees off center) to be used to detect traffic in adjacent traffic lanes, may also have a relatively wide field of view, which may overlap the field of view of the front-facing camera. Side-facing sensors are those that are directed outward from the sides of the vehicle. Cameras in the sensor array may include infrared or visible light cameras, able to focus at long-range or short-range with narrow or large fields of view.

In example embodiments, the vehicle includes an on-board diagnostics system to record vehicle operation and other aspects of the vehicle's performance, maintenance, or status. The vehicle may also include various other sensors, such as driver identification sensors (e.g., a seat sensor, an eye tracking and identification sensor, a fingerprint scanner, a voice recognition module, or the like), occupant sensors, various environmental sensors (e.g., to detect wind velocity, outdoor temperature, barometer pressure, rain/moisture), or location sensors (e.g., one or more global positioning system (GPS) sensors), or the like.

In operation, the vehicle obtains sensor data via a sensor array interface 106A, 106B. For example, the vehicle obtains sensor data from forward-facing sensors to detect an obstacle or potential collision hazard. The forward-facing sensors may include radar, LIDAR, visible light cameras, or combinations. Radar is useful in nearly all weather and longer-range detection, LIDAR is useful for shorter range detection, cameras are useful for longer ranges but often become less effective in certain weather conditions, such as snow. Combinations of sensors may be used to provide the widest flexibility in varying operating conditions.

The vehicle controller subsystem may be installed as an after-market component of the vehicle, or may be provided as a manufacturer option. As an after-market component, the vehicle controller subsystem may plug into the existing ADAS in the vehicle to obtain sensor data and may provide the warning lights. Alternatively, the vehicle controller subsystem 102 may incorporate its own sensor array to sense following vehicles.

In example embodiments, the autonomous vehicle(s) 102 or subsystems of the autonomous vehicle(s) 102 may communicate using a network 112, which may include local-area networks (LAN), wide-area networks (WAN), wireless networks (e.g., 802.11 or cellular network), the Public Switched Telephone Network (PSTN) network, ad hoc networks, personal area networks (e.g., Bluetooth), vehicle-based networks (e.g., Controller Area Network (CAN) BUS), or other combinations or permutations of network protocols and network types. The network may include a single local area network (LAN) or wide-area network (WAN), or combinations of LANs or WANs, such as the Internet. The various devices coupled to the network may be coupled to the network via one or more wired or wireless connections.

In example embodiments, one or more of the plurality of autonomous vehicles communicate with a road side unit (RSU), such as RSU 112. In example embodiments, information for "user analytics as a service" flows over the air between a plurality of vehicles and/or between the plurality of vehicles and one or more RSUs. In example embodiments, the vehicles and devices inside the vehicles are be polled for model updates or training data updates. In example embodiments, an over-the-air signaling framework is used to poll for and capture updates across a cluster of autonomous vehicles.

In example embodiments, rather than combining the distributed models with the help of an RSU (e.g., including an aggregation server), the model-generation and/or learning is combined in a peer-to-peer fashion. For example, in the case of fleet control, each vehicle may be configured to process its own sensor data and compute its intermediate model. This model may be then compressed and broadcast to nearby users, exploiting the statistical properties of nearby users to transfer knowledge.

In example embodiments, to transfer knowledge between fleet members (e.g., vehicles grouped together by one or more ownership entities), statistical properties of vehicles or users may be leveraged. For example, fleet members may only share information when their properties are correlated statistically with each other with respect to a configurable correlation strength and/or confidence value. This correlation feature can reduce time and bandwidth in a very congested road or high load situation (e.g., with respect to a server at an RSU) because only a subset of a fleet or cluster of vehicles associated with a point of interest would share or update models and/or training data.

In example embodiments, processor(s) 108A, 108B and/or other computing resources are included in the vehicle controller subsystems (e.g., to support learning applications 110A, 110B and distributed AI or ML modules 110A, 110B). In example embodiments, the learning application 110A, 110B are provisioned on an RSU or a vehicle (e.g., by one or more manufacturers or service providers) and made available to the vehicle controller subsystems (e.g., based on proximity detection, such as GPS or near-field communication). In example embodiments, the learning applications, described in more detail below, are configured to learn information about driving profiles, driving policies, or a driving environment relevant to a particular location or type of location (e.g., a type of road, a function classification of the road, and so on) in which nearby vehicles are operating. In example embodiments, the distributed AI or ML modules, described in more detail below, are configured to implement one or more of the operations described herein (e.g., to provide for distribution and aggregation of AI or ML models that are specific to the location or the type of location).

In example embodiments, a model of good driving behavior for a particular location or type of location is generated based on aggregations of driving behavior models received from each vehicle at an RSU or an additional vehicle. In example embodiments, various policies for AD that are specific to the location or type of location may be generated based on the model of good driving behavior. The model and/or policies may then be distributed to vehicles in the location or the type of location for near real-time integration into their AD applications and/or for further local refinement by each vehicle.

Figure 2:
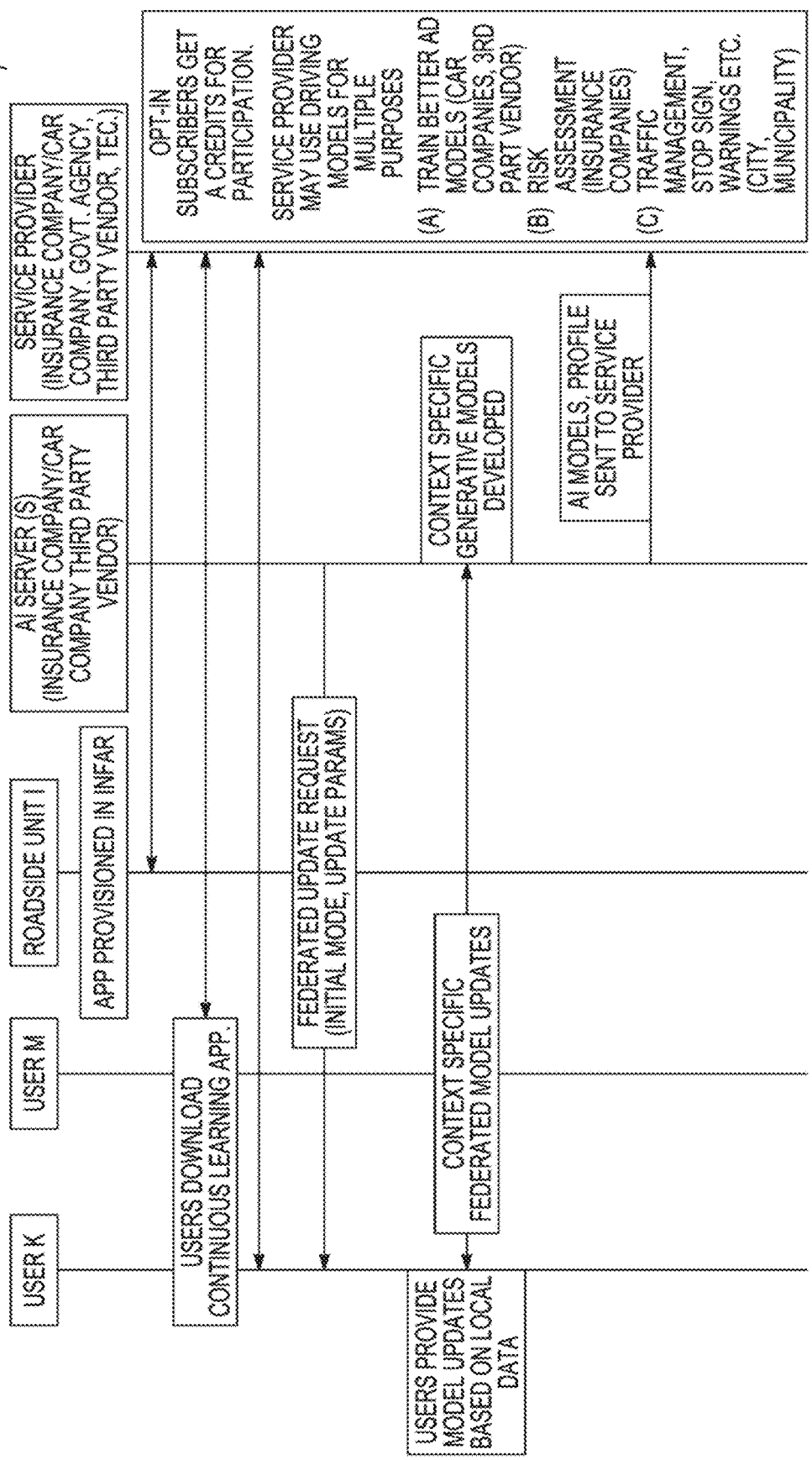
FIG. 2 is a diagram depicting a signaling flow for learning user driving behaviors or AD policies in a distributed manner.

FIG. 2 is a diagram depicting a signaling flow for learning user driving behaviors or AD policies in a distributed manner.

In the depicted distributed learning framework, each vehicle driving by an intersection or close to a Road-side Unit (RSU) is configured to contribute parameters of a locally learned AI or ML model to a server hosted on road-side infrastructure (e.g., and RSU) and/or hosted in another vehicle. Several types of models may be trained using this approach, each of which can provide different benefits. For example, AI or ML-based models for driving profiles and behavior may be trained in a distributed manner without sacrificing privacy. Additionally, the per vehicle and/or per-user profiles of driving behaviors may be used to train AD models in a correlated way, accounting for multiple agents' behaviors at a given instance/location. Once the correlated, time- and location-specific multi-agent driving behavioral models and/or training data are collected, optimal AD algorithms may be developed for targeting different objectives such as (a) driving efficiency subject to safety rules such as RSS, (b) defensive driving that emphasizes safety with relaxed requirements on driving time, and so on.

In example embodiments, each vehicle trains a generative model for its driving behavior (e.g., User K). In example embodiments, the model is a simple classifier for driving behaviors (e.g., aggressive, typical, conservative, and so on). These profiles may then be used as inputs for a specific vehicle (e.g., User M) to train its driving policy conditioned on a given classification of other vehicles' behavior(s). To incentivize users to contribute to the learning, the users may be able to download a snapshot of "summary driving profiles" of other users that improve their local AD policies.

More generally, multi-agent learning algorithms may be used to develop an overall AD model that may be downloaded by participating users (and applied for the specific context). For example, federated multi-task learning on a graph may be used.

In example embodiments, a continuous learning application (e.g., for learning user driving behaviors or AD policies) is provisioned (e.g., in a server of an RSU). In example embodiments, a service provider (e.g., an insurance company, a car company, a government agency, or a vendor) subscribes to use training data or AI or ML models generated using the continuous learning applications. In example embodiments, subscribers may be opt-in subscribers who receive credits based on levels of participation. In example embodiments, a User K downloads the continuous learning application provisioned at the RSU and deploys the continuous learning application in a vehicle. In example embodiments, User K provides model updates based on local data collected by the vehicle of User K to other users (e.g., User M) and/or the RSU.

In example embodiments, third parties (e.g., insurance companies, car companies, third-party vendors, and so on) may access training data used to generate context-specific distributed model updates for generation of one or more context-specific generative models at an AI server. In example embodiments, the generative models may then be sent to the service providers, which, in turn, may use the generative models for various purposes.

For example, insurance companies may use the user profiles for determine driving behavior and provide customized insurance policies for users. Government agencies such as cities, municipalities, or transport authorities may use the correlated profiles to for enhancing traffic management, road-planning and placing warning signs, and so on. Car companies or third-party AI vendors may use the information to develop AI-based autonomous driving or driving assistance solutions (AD/ADAS). In example embodiments, the generative models may also be utilized in fleet management systems, such as for autonomous and partially automated vehicles, as a specific system can be cheaper to maintain and operate. To this end, experiences of distinct fleet members may be aggregated, in contrast to a single machine's experiences. Because fleet members may carry out similar tasks, they may share a same system design. However, in reality, the fleet members and drivers may differ slightly (e.g., in dynamics or behavior). For example, business users or private users may have different behaviors when borrowing cars. Here, intelligently aggregating the diversity of data over all or a plurality of members enhances the learning process.

In example embodiments, the disclosed operations provide enhanced privacy for the end customers by limiting the sharing of user information to the locally-generated AI or ML models rather than raw data. Additionally, the federated learning framework helps users benefit from driving behaviors of cars that may be manufactured by different car manufacturers and serves as a way to benefit the reuse of the same data more globally.

The generative models may obtain user driving profiles for a large number of users. In a practical setting, there may be cases where different generative models can output different driving profiles for different sets of users. For example, this may be true when multiple different service providers utilize different models to characterize user driving profiles. Similarly, different generative models may be utilized based on geography of users even when analyzed by the same service provider. For example, one generative model may specifically output the different safety related variables for the users, such as frequency of hard braking, number of accelerations, rate of night-time driving, and so on. Another generative model may profile users based on the energy efficiency of the drivers, providing data such as the average number of miles driven/month, miles/gallon, average number of passengers, accelerations, and so on.

Consider the case where ratings are given for a large set of driving profiles that are attributed to a small set of users V. A full matrix of users U (where V⊂U and |) may be populated and a complete driving profile, including attributes P, containing ranking of users across each of the driving profile/attribute may be generated. An objective may be to have a scalable model that can predict the rankings of users across missing attributes.

To this end, a Graph Neural Network based approach is provided. Given an incomplete U×P matrix, a user-similarity graph network is defined. The user-similarity matrix may be constructed by, for example, calculating the Pearson correlations that considers the attributes that already have ratings by pairs of users. Each graph signal may correspond to a different driving profile/attribute and may be composed of existing ratings for every user in the network who has been given a rating.

Figure 3:
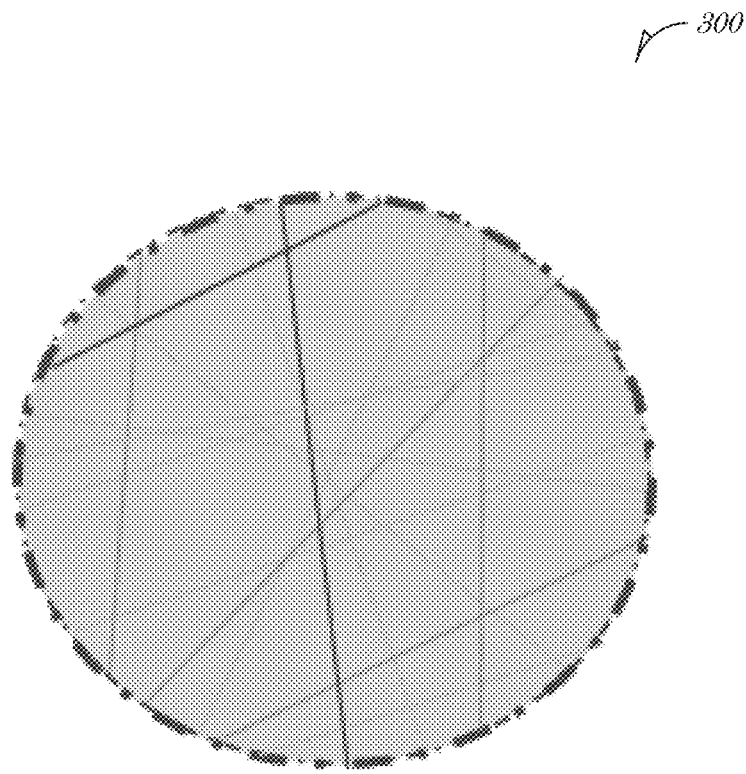
FIG. 3 is a graph of an example representation of an Undirected User Similarity Network.

FIG. 3 is a graph of an example representation 300 of an Undirected User Similarity Network. Here, nodes represent users and edges represent the average similarity of the users across driving profiles. Node radii are proportional to graph signal intensity. Edge width is proportional to differences in graph signal between nodes.

The set of profiles P may include the union of all profiles generated from a library of generative models. Train and test samples may be obtained from the graph signals (e.g., by zeroing out the ratings given to a user for which we are interested in predicting the ratings). The Graph Neural Network (GNN) may be trained to predict the ratings for the zeroed out user on any attribute/profile that has been rated for other users. In other words, the goal is to complete the $u^{th}$ row of the user similarity rating matrix. The GNN may be trained centrally and deployed at the AI server of a service provider. The AI server may then obtain the full driving profile for users that only have partial profiles populated.

Once driving profiles are available, offline and online distributed approaches may be used to develop a driving policy that simultaneously accounts for multiple vehicles operating in a specific context (location, time of day, and so on).

Figure 4:
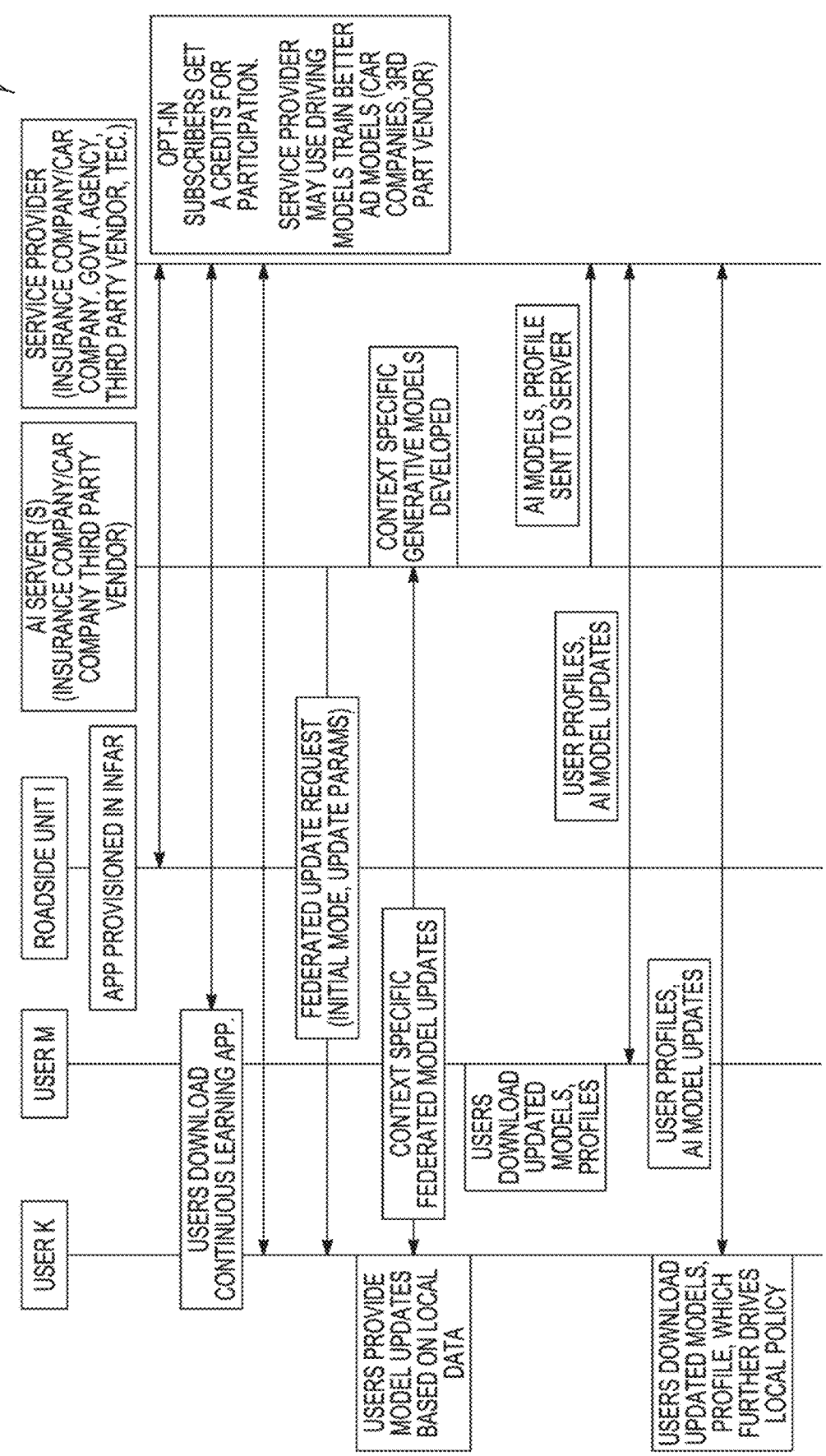
FIG. 4 is a diagram depicting a framework for developing driving models for users' driving profiles.

FIG. 4 is a diagram depicting a framework for developing driving models for users' driving profiles.

In example embodiments, users' quantized profiles are made available to each vehicle/user. The local driving policy is then based on classifying the surrounding vehicles' behavior according to different driving profiles, which are then factored in adapting the local AD model. Here the AD model may be trained offline with respect to the various driving profiles available for a given context. This offline trained AD model is also downloaded for users along with the driving profiles. The drive policy is then unfolded according to the local classification of the driving behaviors of surrounding vehicles. Alternatively, the local driving model (combined with the local classification of driving behaviors of surrounding vehicles) may also be done in a distributed manner.

Such AD models may also be trained via Graph NN (e.g., to capture the spatial/temporal relationship between the driving policies of multiple vehicles on the road).

In example embodiments, the disclosed framework may trigger appropriate action when needed, such as in an emergency (e.g., when a driver has a health condition and the system categorizes his driving style as dangerous). The action can trigger an API function in the car or in a fleet management API to take over the steering function. To better understand the user action, a health sensor from the user device may be taken into account.

In example embodiments, this framework may be extended more generally to other profiling applications using alternate sensors, such as phones, while users are traveling (e.g., including user's viewing/listening patterns, internet usage, engagement levels, and so on).

Figure 5:
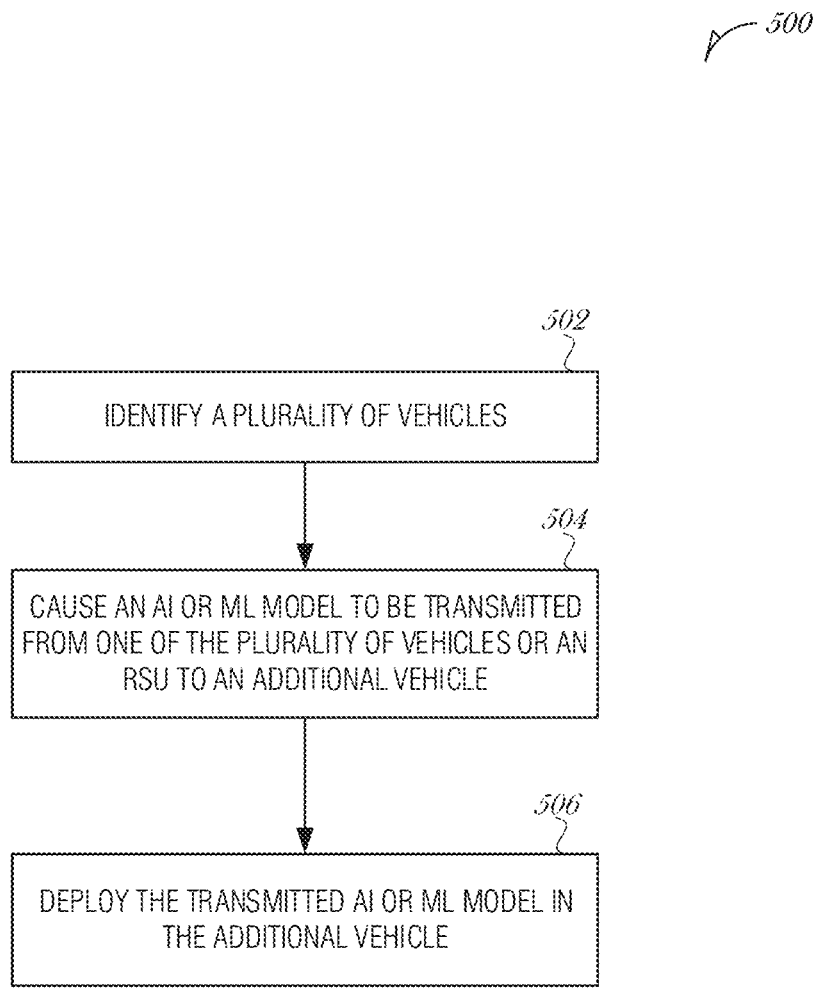
FIG. 5 is an example method of implementing distributed AI/ML learning for AD.

FIG. 5 is an example method of implementing distributed AI/ML learning for AD.

At operation 502, a plurality of vehicles is identified. In example embodiments, the plurality of vehicles is identified based on a context of an operation of each of the plurality of vehicles. In example embodiments, the context of the operation includes at least one of a location and a type of the location. For example, the location might correspond to GPS coordinates or another unique identifier of the location. A type of a location might include one or more classifications of the location, such as by materials (e.g., earthen, gravel, murrum, kankar, Water Bound Macadam (WBM), bituminous, concrete), function (e.g., national highway, state highway, district road, rural road, village road, interstate, other arterial, collector road, or local road), traffic volume (e.g., light traffic roads (e.g., 400+ vehicles per day), medium traffic roads (e.g., up to 1000 vehicles per day), high-traffic roads (e.g., 1000+ vehicles per day)), pedestrian volume, cyclist volume, motorcyclist volume, width, economy (e.g., low-cost roads, medium-cost roads, high-cost roads), traffic type (e.g., pedestrian ways (e.g., pedestrians only), cycle or bicycle tracks, motorways (e.g., specific vehicles only)), rigidity (e.g., flexible pavement or rigid pavement), topography (e.g., plain area roads and/or hilly area roads), and/or safety (e.g., pedestrian safety data, driver safety data, vehicle safety data). For example, for a type of location that includes at least a portion that is classified as an intersection, the intersection may, in turn, be classified by one or more of road segments, traffic controls, lane design, turn lanes, turn signals, lane management, and so on.

In example embodiments, each of the plurality of vehicles is configurable to generate an AI or ML model specific to the location or the type of the location. For example, each of the plurality of vehicles may be configured (e.g., based on installation of a machine-learning application) to collect training data (e.g., via one or more sensors of the vehicle, such as the sensors described above) while the vehicle is present at the location or the type of the location and to generate an AI or ML model based on the collected data that is specific to the location of the type of the location. In example embodiments, the AI or ML model is deployable in the vehicle to control at least one aspect pertaining autonomous driving of the vehicle, such as acceleration, braking, steering, and so on. In example embodiments, a maturity of the AI or ML model deployed in a particular vehicle is tracked (e.g., based on an amount of training data specific to the location that was used to generate the AI or ML model or a number and/or a maturity of additional models (e.g., from other vehicles) with which the AI or ML model has been aggregated).

At operation 504, an AI or ML model is caused to be transmitted from the RSU or one of the plurality of vehicles to an additional vehicle. In example embodiments, this transmission is based on a detection that the RSU or the one of the plurality of vehicles is within a proximity to the additional vehicle. In example embodiments, this transmission is based on a determination that the additional vehicle is present or anticipated to be present at the location or the type of the location (e.g., within a time frame) (e.g., based on a planned route in a GPS system deployed within the vehicle or a history of previous routes taken by the vehicle).

At operation 605, the transmitted AI or ML model is caused to be deployed in the additional vehicle such that at least one assessment (e.g., of a safe speed, a driving behavior, and so on) made by an AI or ML autonomous driving application that is configured to control the additional vehicle is optimized for the location or the type of the location. In example embodiments, the deployment and/or the transmission of the AI or ML model is based on a maturity of the AI or ML model satisfying a maturity threshold.

In example embodiments, the causing of the AI or ML model to be transmitted is further based on a detection that a bandwidth available to the RSU, the one of the plurality of vehicles, or the additional vehicle transgresses a minimum (e.g., configurable) bandwidth threshold.

In example embodiments, the causing of the AI or ML model to be transmitted is further based on a detection that the one of the plurality of vehicles and the additional vehicle belong to a same fleet of vehicles.

In example embodiments, the causing of the AI or ML model to be deployed in the additional vehicle is based on a user of the vehicle opting in to receiving the AI or ML model.

In example embodiments, the deploying of the transmitted AI or ML model in the additional vehicle includes aggregating the transmitted AI or ML model with an additional AI or ML model that was previously generated locally by an AI or ML learning application installed on the additional vehicle.

In example embodiments, the installing of the AI or ML learning application on the additional vehicle is based on a detection that the AI or ML learning application was previously provisioned on the RSU or the one of the plurality of vehicles.

In example embodiments, the transmitted AI or ML model is a model that was previously aggregated with an additional AI or ML model that was generated locally by an additional one of the plurality of vehicles.

In example embodiments, the causing of the AI or ML model to be transmitted includes sending the AI or ML model over the air.

In example embodiments, the aggregated AI or ML models are caused to be transmitted to an additional vehicle of the plurality of vehicles or the RSU.

In example embodiments, a plurality of AI or ML models are transmitted from the plurality of vehicles to the RSU. Each of the plurality of AI or ML models may be generated locally by an AI or ML application installed on each of the plurality of vehicles and transmitted to the RSU based on a proximity of each of the plurality of vehicles to the RSU. The plurality of AI or ML models may then be further aggregated at the RSU. In example embodiments, the RSU may aggregate the models based on the maturity of the models. Thus, in example embodiments, only AI or ML models transgressing a maturity threshold may be communicated to and/or aggregated at the RSU.

In example embodiments, the AI or ML models are transmitted to an AI system of an entity (e.g., based on the entity opting into a subscription to receive the aggregated AI or ML models), where they may be subsequently deployed by the entity in other AI applications of the entity (e.g., to optimize policies or behaviors based on the type of the location).

Figure 6:
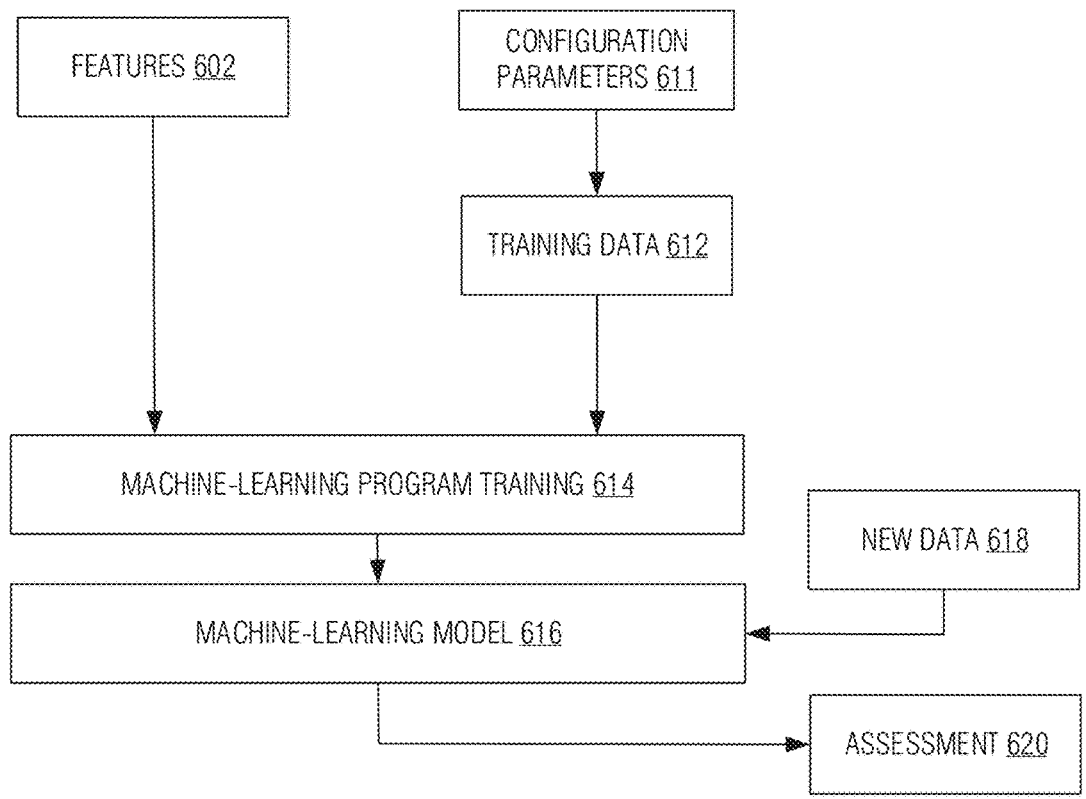
FIG. 6 illustrates the training and use of a machine-learning program or agent, such as one or more programs based on an AI or ML model local to vehicle, according to some example embodiments.

FIG. 6 illustrates the training and use of a machine-learning program or agent, such as one or more programs based on an AI or ML model local to vehicle, according to some example embodiments. In some example embodiments, machine-learning programs (MLPs), also referred to as machine-learning algorithms or tools, are utilized to perform AD.

Machine Learning (ML) is an application that provides computer systems the ability to perform tasks, without explicitly being programmed, by making inferences based on patterns found in the analysis of data. Machine learning explores the study and construction of algorithms, also referred to herein as tools, that may learn from existing data and make predictions about new data. Such machine-learning algorithms operate by building an ML model 616 from example training data 612 in order to make data-driven predictions or decisions expressed as outputs or assessments 620. Although example embodiments are presented with respect to a few machine-learning tools, the principles presented herein may be applied to other machine-learning tools.

Data representation refers to the method of organizing the data for storage on a computer system, including the structure for the identified features and their values. In ML, it is typical to represent the data in vectors or matrices of two or more dimensions. When dealing with large amounts of data and many features, data representation is important so that the training is able to identify the correlations within the data.

In example embodiments, there are two modes for ML: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm using information that is neither classified nor labeled, and allowing the algorithm to act on that information without guidance. Unsupervised ML is useful in exploratory analysis because it can automatically identify structure in data.

In example embodiments, supervised ML tasks include classification problems and regression problems. Classification problems, also referred to as categorization problems, aim at classifying items into one of several category values (for example, is this object an apple or an orange?). Regression algorithms aim at quantifying some items (for example, by providing a score to the value of some input). Some examples of commonly used supervised-ML algorithms are Logistic Regression (LR), Naive-Bayes, Random Forest (RF), neural networks (NN), deep neural networks (DNN), matrix factorization, and Support Vector Machines (SVM).

In example embodiments, unsupervised ML tasks include clustering, representation learning, and density estimation. Some examples of commonly used unsupervised-ML algorithms are K-means clustering, principal component analysis, and autoencoders.

The training data 612 comprises examples of values for the features 602. In some example embodiments, the training data comprises labeled data with examples of values for the features 602 and labels indicating the outcome, such as am assessment of a driver's behavior. The machine-learning algorithms utilize the training data 612 to find correlations among identified features 602 that affect the outcome. A feature 602 is an individual measurable property of a phenomenon being observed. The concept of a feature is related to that of an explanatory variable used in statistical techniques such as linear regression. Choosing informative, discriminating, and independent features is important for effective operation of ML in pattern recognition, classification, and regression. Features may be of different types, such as numeric features, strings, and graphs.

In one example embodiment, the features 602 may be of different types and may include one or more of vehicle sensor array data, vehicle driving commands, or context data (e.g., a type of location, such as an intersection, that is inferred from sensor data, such as GPS coordinates; vehicle driving policy data, or other data inferred from the type of the location, time of day, or other metadata relevant to a context of an operation of the vehicle, such as risk data associated with operating the vehicle).

During training 614, the ML algorithm analyzes the training data 612 based on identified features 602 and configuration parameters 611 defined for the training. The result of the training 614 is an ML model 616 that is capable of taking inputs to produce assessments.

Training an ML algorithm involves analyzing large amounts of data (e.g., from several gigabytes to a terabyte or more) in order to find data correlations. The ML algorithms utilize the training data 612 to find correlations among the identified features 602 that affect the outcome or assessment 620. In some example embodiments, the training data 612 includes labeled data, which is known data for one or more identified features 602 and one or more outcomes, such as a determination of a driving command that is to be issued to a vehicle to autonomously control the vehicle.

The ML algorithms usually explore many possible functions and parameters before finding what the ML algorithms identify to be the best correlations within the data; therefore, training may make use of large amounts of computing resources and time.

In example embodiments, some ML algorithms may include configuration parameters 611, and the more complex the ML algorithm, the more parameters there are that are available to the user. The configuration parameters 611 define variables for an ML algorithm in the search for the best ML model. The training parameters include model parameters and hyperparameters. Model parameters are learned from the training data, whereas hyperparameters are not learned from the training data, but instead are provided to the ML algorithm.

Some examples of model parameters include maximum model size, maximum number of passes over the training data, data shuffle type, regression coefficients, decision tree split locations, and the like. Hyperparameters may include the number of hidden layers in a neural network, the number of hidden nodes in each layer, the learning rate (perhaps with various adaptation schemes for the learning rate), the regularization parameters, types of nonlinear activation functions, and the like. Finding the correct (or the best) set of hyperparameters can be a very time-consuming task that makes use of a large amount of computer resources.

When the ML model 616 is used to perform an assessment, new data 618 is provided as an input to the ML model 616, and the ML model 616 generates the assessment 620 as output.

Feature extraction is a process to reduce the amount of resources required to describe a large set of data. When performing analysis of complex data, one of the major problems is one that stems from the number of variables involved. Analysis with a large number of variables generally requires a large amount of memory and computational power, and it may cause a classification algorithm to overfit to training samples and generalize poorly to new samples. Feature extraction includes constructing combinations of variables to get around these large-data-set problems while still describing the data with sufficient accuracy for the desired purpose.

In some example embodiments, feature extraction starts from an initial set of measured data and builds derived values (features) intended to be informative and non-redundant, facilitating the subsequent learning and generalization steps. Further, feature extraction is related to dimensionality reduction, such as reducing large vectors (sometimes with very sparse data) to smaller vectors capturing the same, or a similar, amount of information.

Figure 7:
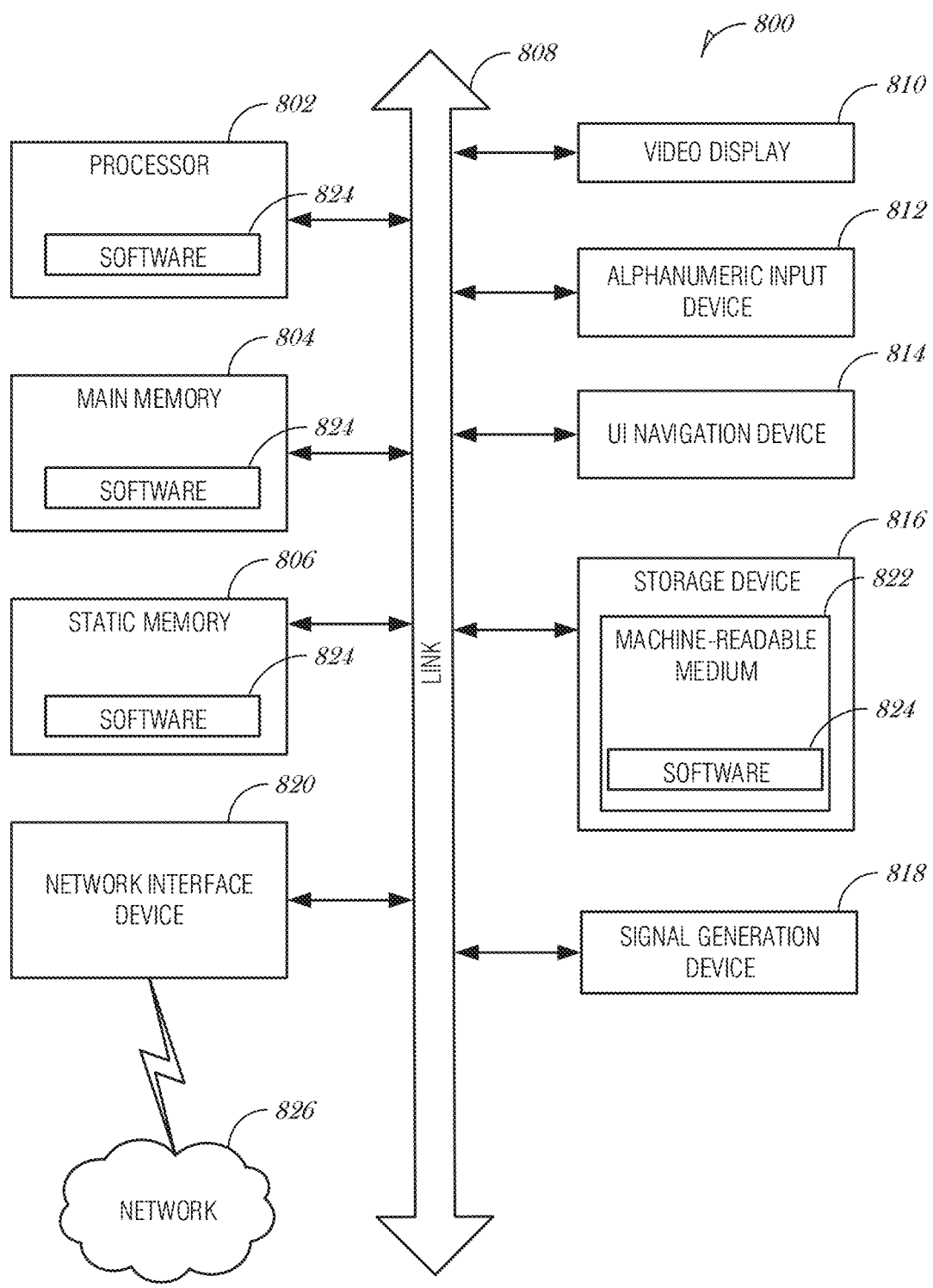
FIG. 7 is a block diagram illustrating an example machine upon which any one or more of the techniques (e.g., methodologies) discussed herein may perform, according to an embodiment.

FIG. 7 is a block diagram illustrating a machine in the example form of a computer system 800, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a head-mounted display, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via a link 808 (e.g., bus). The computer system 800 may further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are incorporated into a touch screen display. The computer system 800 may additionally include a storage device 816 (e.g., a drive unit), a signal generation device 818 (e.g., a speaker), a network interface device 820, and one or more sensors (not shown), such as a global positioning system (GPS) sensor, compass, accelerometer, gyrometer, magnetometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system comprising:
   one or more computer processors;
   one or more computer memories, and
   a set of instructions incorporated into the one or more computer memories, the set of instructions configuring the one or more computer processors to perform operations comprising:
   generating, at a vehicle, an artificial intelligence (AI) model specific to a context of an operation of the vehicle, the context including a location or a type of the location where the vehicle travels, the generating based on training data collected from one or more sensors of the vehicle while the vehicle was present at the location or the type of the location;
   in response to a detection that the vehicle is within a proximity to a road side unit (RSU) associated with the location or the type of the location or that the vehicle is within a proximity to an additional vehicle that is at least anticipated to be present at the location or the type of the location, causing an AI model transmission to the RSU or the additional vehicle or causing an AI model reception from the RSU or from the additional vehicle; and
   based on the causing of the AI model transmission or the AI model reception, causing deployment of an additional AI model in the vehicle, the deployment causing the vehicle to use the additional AI model to optimize the vehicle for the location or the type of the location without aggregating the AI model with the additional AI model.

2. The system of claim 1, wherein the causing of the AI model transmission or the causing the AI model reception is based on a detection that a bandwidth available to the RSU, the vehicle, or the additional vehicle transgresses a minimum bandwidth threshold.

3. The system of claim 1, wherein the causing of the AI model transmission or the causing of the AI model reception is further based on a detection that the vehicle and the additional vehicle belong to a same fleet of vehicles.

4. The system of claim 1, wherein the causing deployment of the additional AI model is based on a user of the vehicle opting in to receiving the AI model.

5. The system of claim 1, further comprising installing an AI learning application on the vehicle based on a detection that the AI learning application was previously provisioned on the RSU or the additional vehicle.

6. The system of claim 1, wherein the AI model was previously aggregated with an additional AI model that was received from a further vehicle.

7. The system of claim 1, wherein the causing of the AI model transmission includes sending the AI model over the air to the additional vehicle or the RSU.

8. The system of claim 1, further comprising causing transmission of an aggregation of the AI model with the additional AI model to the additional vehicle or the RSU.

9. The system of claim 1, further comprising aggregating a plurality of AI models received from a plurality of further vehicles or the RSU.

10. The system of claim 9, further comprising causing transmission of the aggregated plurality of AI models to an AI system of an entity based on the entity opting into a subscription to receive the aggregated plurality of AI models and wherein the aggregated plurality of AI models identify one or more optimal policies or driver behaviors for the location or the type of the location.

11. A system comprising:
  means for generating an artificial intelligence (AI) model specific to a location or a type of the location based on training data collected from one or more sensors of a vehicle while the vehicle was present at the location or the type of the location;
  means for, in response to a detection that the vehicle is within a proximity to a road side unit (RSU) associated with the location or the type of the location or that the vehicle is within a proximity to an additional vehicle that is at least anticipated to be present at the location or the type of the location, causing an AI model transmission to the RSU or the additional vehicle or causing an AI model reception from the RSU or from the additional vehicle; and
  means for, based on the causing of the AI model transmission or the AI model reception, causing deployment of an additional AI model in the vehicle, the deployment causing the vehicle to use the additional AI model to optimize the vehicle for the location or the type of the location without aggregating the AI model with the additional AI model.

12. The system of claim 11, wherein the causing the AI model transmission or the causing the AI model reception is based on a detection that a bandwidth available to the RSU, the of vehicles, or the additional vehicle transgresses a minimum bandwidth threshold.

13. The system of claim 11, wherein the causing of the AI model transmission or the causing of the AI model reception is based on a detection that the vehicle and the additional vehicle belong to a same fleet of vehicles.

14. The system of claim 11, wherein the causing of the deployment of the additional AI model is based on a user of the vehicle opting in to receiving the AI model.

15. The system of claim 11, further comprising means for installing an AI learning application on the vehicle based on a detection that the AI learning application was previously provisioned on the RSU or the additional vehicle.

16. The system of claim 11, wherein the AI model is a model that was previously aggregated with an additional AI model that was received from a further vehicle.

17. A non-transitory computer-readable storage medium comprising a set of instructions that, when executed by one or more computer processors, causes the one or more computer processors to perform operations comprising:
  generating an artificial intelligence (AI) model specific to a location or a type of the location based on training data collected from one or more sensors of a vehicle while the vehicle was present at the location or the type of the location;
  in response to a detection that the vehicle is within a proximity to a road side unit (RSU) associated with the location or the type of the location or that the vehicle is within a proximity to an additional vehicle that is at least anticipated to be present at the location or the type of the location, causing an AI model reception from the RSU or the additional vehicle; and
  based on the causing of the AI model reception, causing deployment of an additional AI model in the vehicle, the deployment causing the vehicle to use the additional AI model to optimize the vehicle for the location or the type of the location without aggregating the AI model with the additional AI model.

18. The non-transitory computer-readable storage medium of claim 17, wherein the causing of the AI model reception is based on a detection that a bandwidth available to the RSU, the vehicle, or the additional vehicle transgresses a minimum bandwidth threshold.

* * * * *